(12) United States Patent
Kawano

(10) Patent No.: US 6,570,720 B2
(45) Date of Patent: May 27, 2003

(54) OBJECTIVE LENS DRIVE DEVICE OF OPTICAL PICKUP

(75) Inventor: Noriyuki Kawano, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/818,848

(22) Filed: Mar. 28, 2001

(65) Prior Publication Data

US 2001/0028515 A1 Oct. 11, 2001

(30) Foreign Application Priority Data

Mar. 29, 2000 (JP) ........................................ 2000-090393
Mar. 29, 2000 (JP) ........................................ 2000-090394
Mar. 29, 2000 (JP) ........................................ 2000-090398

(51) Int. Cl.$^7$ .............................. G02B 7/02; G11B 7/00
(52) U.S. Cl. ........................ 359/813; 359/814; 359/824; 369/44.15
(58) Field of Search ................................ 359/813, 814, 359/824, 823, 811, 822, 819; 369/44.15

(56) References Cited

U.S. PATENT DOCUMENTS 4,759,005 A * 7/1988 Kasahara .................... 369/44
5,177,640 A * 1/1993 Grassens .................... 359/814
5,548,449 A * 8/1996 Matsui et al. ............... 359/814

FOREIGN PATENT DOCUMENTS

| JP | 6-124467 | 5/1994 |
| JP | 8-50727 | 2/1996 |
| JP | 8-194962 | 7/1996 |
| JP | 8-263861 | 10/1996 |
| JP | 10-27709 | 1/1998 |

* cited by examiner

Primary Examiner—Georgia Epps
Assistant Examiner—Timothy Thompson
(74) Attorney, Agent, or Firm—Oblon, Spivak, McClelland, Maier & Neustadt, P.C.

(57) ABSTRACT

A coil unit on which a focus coil and tracking coils are formed is arranged in a magnetic gap of a magnetic circuit including at least one magnet polarized on two poles in the focusing direction. The magnet and the tracking coils are arranged so that the boundary between the north pole and the south pole of the magnet polarized on two poles in the focusing direction falls within the width formed by the horizontal sides of the tracking coil in the focusing direction, the focusing direction is perpendicular to the focusing direction, when the coil unit is moved in the focusing direction.

21 Claims, 21 Drawing Sheets

OBJECTIVE LENS DRIVE DEVICE OF OPTICAL PICKUP

BACKGROUND OF THE INVENTION

The present invention relates to an objective lens drive device of an optical pickup constituting optical disk apparatus that can radiate an optical spot on a recording medium on a disk to optically read information therefrom.

(Related Art 1)

An optical pickup constituting optical disk apparatus is generally composed of an object lens drive device equipped with an objective lens and an optical system for transmitting/receiving light to/from the objective lens, the object lens drive device is arranged on a stand for mounting an optical system block. The object lens drive device is composed of a movable part equipped with an objective lens, a focus coil and tracking coils, and a fixed part equipped with a magnetic circuit. The movable part is supported by the fixed part via four wires partially enclosed/held with an elastic damper material such as a viscoelastic material.

(Related Art 2)

In a first related art, the movable part is not inclined when it is moved in the focusing direction, because the position of center of gravity of the movable section coincides with the center of drive device in the focusing direction. Next, when the movable part is moved in the tracking direction, the position of center of gravity in the movable part moves the same amount as the tracking moving amount. However, the position of center of drive device in the focusing direction can be assumed as the center of the magnetic circuit in the fixed part so that moving in the focusing direction while moving in the tracking direction causes dislocation between the position of center of drive and the position of center of gravity in the movable part in the focusing direction thereby generating an angular moment around the center of gravity. This generates an inclination of the movable part in the tracking direction.

As a means for solving these problems, an optical pickup is known wherein a movable part including an objective lens is simultaneously driven in the focusing direction and tracking direction, and, in case the center of drive of focusing is dislocated from the center of gravity of the movable part, the rotation moment generated on the movable part is made symmetrical about the center of gravity (for example, Japanese Patent Publication No. Hei. 8-50727).

As shown in FIG. 19, the optical pick up is equipped with magnet holding pieces 208a, 208b, and facing yokes 209a through 209d provided inside the magnet holding pieces and split in the tracking direction so that these pieces face each other, on a base 202 as a fixed base. Via this configuration, as shown in FIGS. 20A and 20B, the magnetic flux density distribution of the magnetic circuit for the focusing drive coil 210 is shaped in twin peaks. This maintains the balance of the rotation moment even in case the movable part including the objective lens 203 is dislocated in the tracking direction and focusing direction, thus preventing inclination of the optical axis of the objective lens 203.

In FIGS. 19 and 20, 201a and 201b represent magnets, 204 represents a lens holder, 205 represents a tracking drive coil, 206a trough 206d represent support members, 207 represents a fixed member, X represents a tracking direction, Y represents a direction perpendicular to a focusing direction and the tracking direction, and Z represents the focusing direction.

(Related Art 3)

In the objective lens drive device according to the first related art, a single magnetic circuit is used and tracking coils are glued on the focus coil and arranged in a magnetic gap in order to downsize and making more low-profile the drive. However, the objective lens drive device according to the related art had a problem that the center of a drive force via a focus coil in the focusing direction was dislocated from the center of a drive force via tracking coils in the tracking direction and making the center of gravity of the movable part coincide with the center of one driving force dislocates the other, and a moment is generated according to the dislocation amount, thus causing unwanted resonance.

As a means for solving these problems, an optical pickup is known wherein a focus coil is arranged to pinch a tracking coil or a tracking coil is arranged to pinch a focus coil in order to cause the center of each drive force to coincide with each other (for example, Japanese Patent Publication No. Hei. 6-124467).

As shown in FIG. 21, the focus coil 310 is fixed to the top and bottom sections of a bobbin 312 via adhesion and the a tracking coil 311 is fixed to the center of the bobbin 312 via adhesion in a position it is pinched by the focus coil 310. As shown in FIG. 22, the focus coil 310 is fixed to the center of the bobbin 312 via adhesion and the tracking coil 311 is fixed to the focus coil 310 via adhesion in a position it pinches the focus coil 310 from top and bottom, the respective coils placed in a yoke 309 that fixes a permanent magnet 309 via adhesion. The optical pickup allows the center of a drive force in the focusing direction (arrow A) and in the tracking direction (arrow B) to coincide with the center of gravity of the movable part by feeding a current across both coils 310, 311.

(Related Art 4)

In the objective lens drive according to the first related art, it is required to raise a high-order resonance frequency in order to support high-speed optical disk apparatus. As a means for solving this problem, an objective lens drive device is known wherein the objective lens attachment section of the lens holder is formed to gradually get thinner toward the free end so that a high-order resonance frequency may be raised (for example, Japanese Patent Publication No. Hei. 8-194962).

As shown in FIG. 23, the lens holder 411 is formed with its bottom face tapered so that the objective lens attaching section 411c may become thinner toward the free end (on the left in the figure) of the lens holder 411 and that the objective lens attaching section 411c becomes thicker toward the fixed part (on the right in the figure). The objective lens attaching section 411c has a thickness b at the front edge and a thickness c at the rear edge.

In the objective lens drive device according to the second related art, a problem arises that a magnetic circuit must have a complicated shape in order to provide twin-peak magnetic flux distribution of the magnetic circuit for the focusing drive coil 21. Even in such a configuration, it is difficult to sufficiently downsize the moment. This leads to a problem that moving the movable part in the tracking direction causes the inclination of the movable part and generates coma aberration, thus worsening the read signal jitter.

Further, in the objective lens drive device according to the third related art, a problem arises that a side facing the side arranged in the magnetic gap of the focus coil 310 is arranged outside the magnetic gap thus influenced by a leak magnetic flux from the magnetic circuit and generating a drive force and a moment in the opposite direction, resulting in that it is difficult to make the center of gravity of the magnetic circuit coincide with the center of the actual driving force.

In the objective lens drive device according to the fourth related art, a problem arises that, since the fixed part of the objective lens attaching section 411c of the lens holder 411 is formed to gradually become thicker, a mirror (right angle prism) arranged beneath the objective lens 411b must be lowered as the fixed part of the objective lens attaching section 411c is made thicker, thus preventing a low-profile optical pickup.

SUMMARY OF THE INVENTION

The invention aims at solving the above problems in the related art.

Means for solving the problems will be explained using FIG. 1 corresponding to an example of the invention. According to the invention, a coil unit on which a focus coil 3f and tracking coils 3t are formed is arranged in a magnetic gap 5g of a magnetic circuit containing at least one magnet 5 polarized on two poles in the focusing direction F and the magnet 5 and the tracking coils 3t are arranged so that the boundary 5b between the north pole and the south pole of the magnet 5 polarized on two poles in the focusing direction F falls within the width formed by the horizontal sides B (D) of the tracking coil 3t in the focusing direction F, the horizontal sides B (D) are perpendicular to the focusing direction, when the coil unit 3 is moved in the focusing direction F.

In such a configuration, the magnet 5 is formed on two poles polarized in the focusing direction F so that the magnetic circuit has a simple shape. On the tracking coil 3t is generated a moment having an approximately equal quantity to that of a moment caused by a thrust Df of a focus coil 3f in the focusing direction F and in the opposite direction to that of the latter moment. This sufficiently reduces the inclination of an objective lens 2 in the tracking direction T.

Means for solving the problems will be explained using FIG. 8 corresponding to an example of the invention. According to the invention, a focus coil 33f and tracking coils 33t are attached to a coil seating 31 with the center in the coil thickness direction matched and the focus coil 33f is arranged in a magnetic gap 5g of a magnetic circuit containing one magnet 5 polarized on two poles in the focusing direction F.

In such a configuration, the center of a drive force generated in the focusing direction F coincides with the center of a drive force generated in the tracking direction and the center of gravity of the movable part. The focus coil 33f generates only drive forces in the same direction.

Further, means for solving the problems will be explained using FIG. 16 corresponding to an example of the invention. According to the invention, a lens holder 1 is formed of a resin containing a light metal or a carbon fiber with high flexural elasticity modulus and a coil unit 3 is attached in two notches 1a of a lens holder formed in the tracking direction T.

In such a configuration, the elasticity ratio of the lens holder 1 becomes higher thus elevating the high-order resonance frequency. Thus, the mirror arranged beneath the objective lens 2 need not be lowered.

DETAILED DESCRIPTION OF THE PREFERRED EMBODIMENT

Detailed Description of the preferred embodiment will be described below.

(Embodiment 1)

Figure 1:
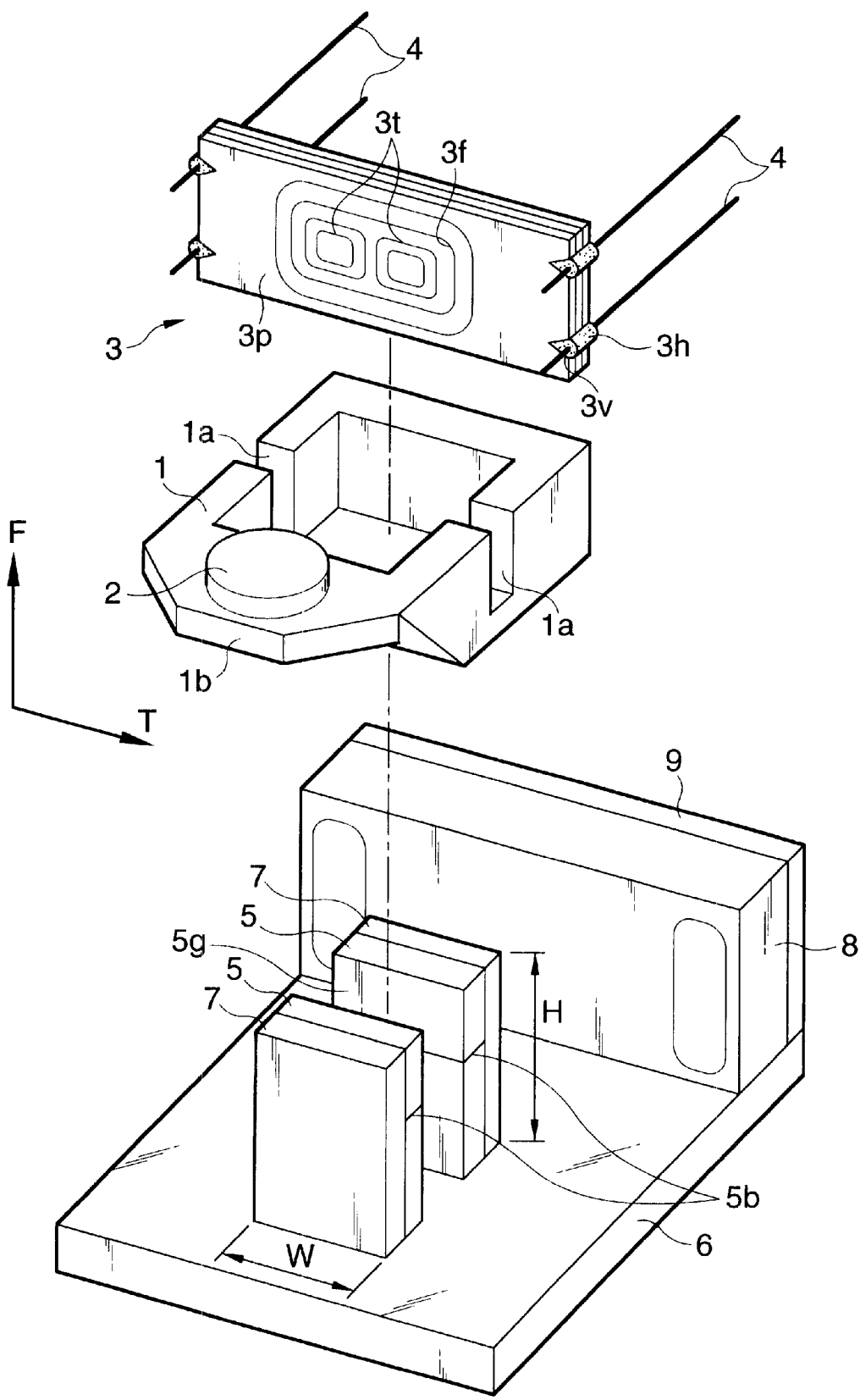
FIG. 1 is an exploded perspective view of a first embodiment of the invention.

FIG. 1 is an exploded perspective view of a first embodiment of the invention. In FIG. 1, 1 represents a lens holder, 2 represents an objective lens, 3 represents a coil unit, 3f represents a focus coil, 3t represents tracking coils, 5 represents a magnet, 5g represents a magnetic gap, and 5b represents a boundary between the north pole and the south pole of the magnet 5.

In the lens holder 1, two notches 1a are formed in the tracking direction T. An objective lens attaching section 1b for holding the objective lens 2 is formed in uniform thickness.

The coil unit 3 is formed of necessary number of laminated printed circuit boards 3p where one focus coil 3f and two tracking coils 3t are formed. The focus coil 3f is arranged in the center of the printed circuit board 3p and the two tracking coils 3t are arranged in the tracking direction T in a hollow section of the focus coil 3f.

The coil unit 3 is inserted and glued to the notches 1a and fixed to the lens holder 1. On both ends of the coil unit 3 in the tracking direction T are formed four V-grooves 3v, to which one end of each of four conductive elastic members 4 is fixed via solder 3h.

Figure 2:
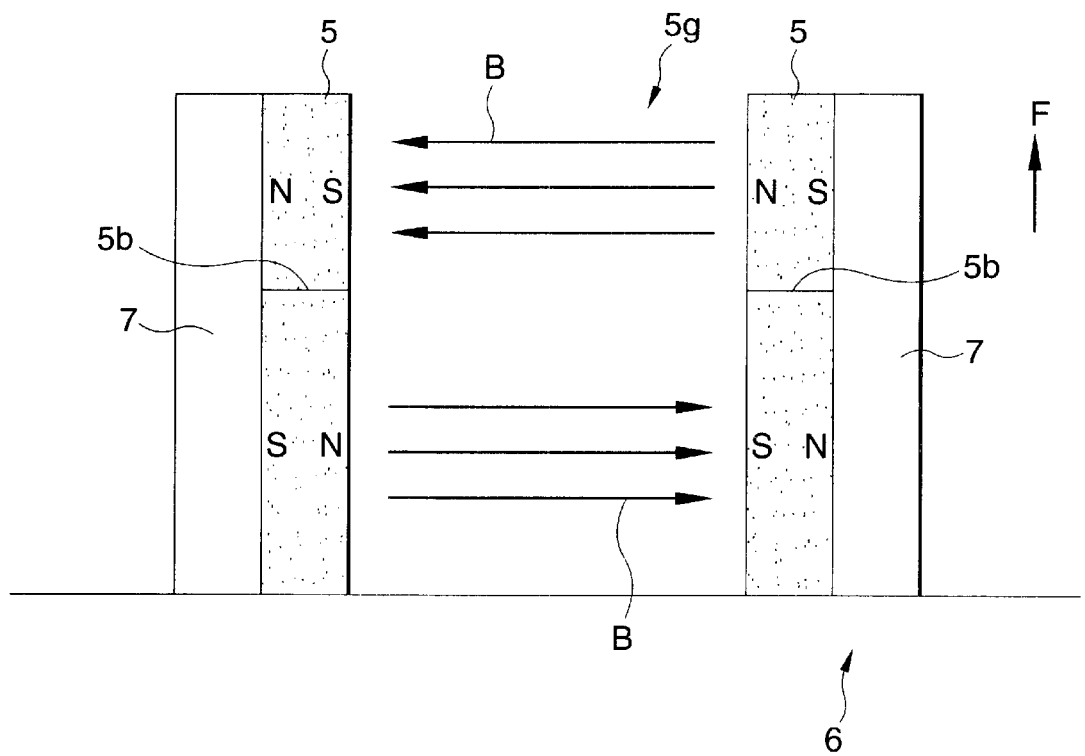
FIG. 2 is a side view of a magnetic circuit according to the first embodiment of the invention.

As shown in FIG. 2, the magnet 5 is polarized on two poles in the focusing direction F via a boundary 5b between the north pole and the south pole and glued to yokes 7 on a yoke base 6. Two magnets facing each other form a magnetic gap 5g. The direction of the line of magnetic force B is reversed in the focusing direction of the magnetic gap 5g. The magnet 5 may be composed of a single magnet.

The coil unit 3 is arranged in the magnetic gap 5g. The other end of the conductive elastic member 4 is fixed to a base board 9 via solder through a wire base 8. This supports the lens holder 1 movably in via a cantilever against the fixed part composed of the magnet 5, the yoke base 6, the yoke 7, the wire base 8, and the base board 9.

In such a configuration, energizing the focus coil 3f and the tracking coil 3t generates a drive force in the focusing direction F and the tracking direction T, thus allowing the objective lens 2 to be moved in the focusing direction F and the tracking direction T, in accordance with the surface deflection and decentering of a recording medium.

Figure 3:
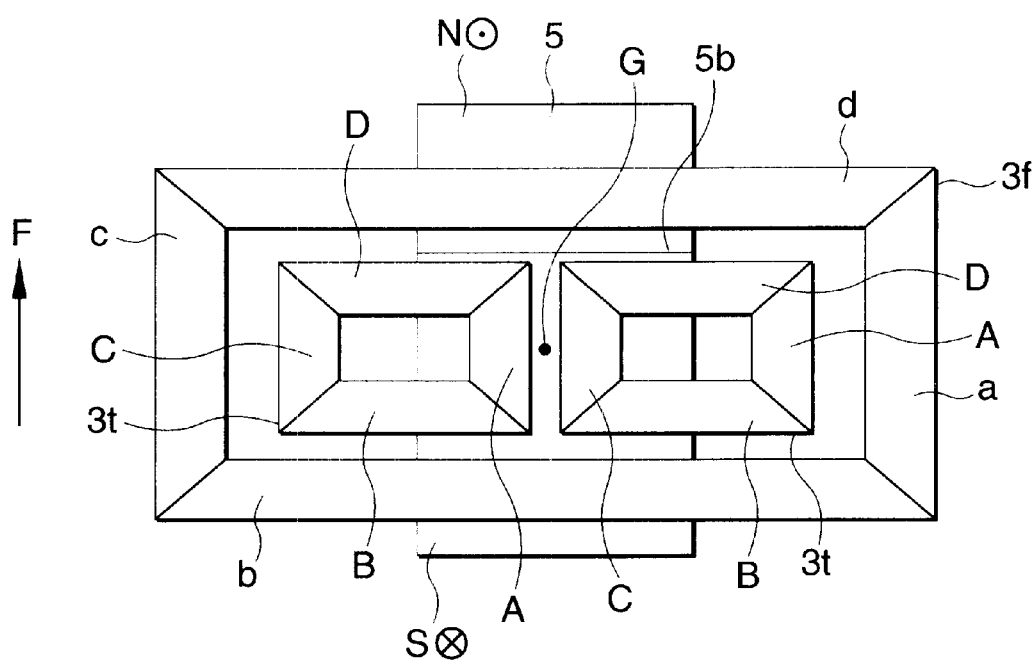
FIG. 3 is an arrangement plan showing the relationship between a magnet, a focus coil and tracking coils in the self-weight position in the focusing direction according to the first embodiment of the invention.

Next, the positional relationship between the magnet 5, the focus coil 3f and two tracking coils 3t will be explained. As shown in FIG. 3, the center of gravity of the objective lens drive device composed of the lens holder 1, the objective lens 2 and the coil unit 3 coincides with the center of the coil unit 3. This is the position of the movable part movably supported via a cantilever by the conductive elastic member, that is, the self-weight state in the focusing direction F. In this position, the boundary between the north pole and the south pole of the magnet 5 is placed a little above the upper side D out of the horizontal sides B and D that are perpendicular to the focusing direction F of the tracking coil 3t. Of the focus coil 3f, only the center of the horizontal sides b, d perpendicular to the focusing direction F of the tracking coil 3t is arranged within the magnetic gap 5g (a gap within a width W and a height H of the magnets 5 facing each other). Of the two tracking coils 3t, only the right half of one and the left half of the other are arranged in the magnetic gap 5g.

Figure 4A:
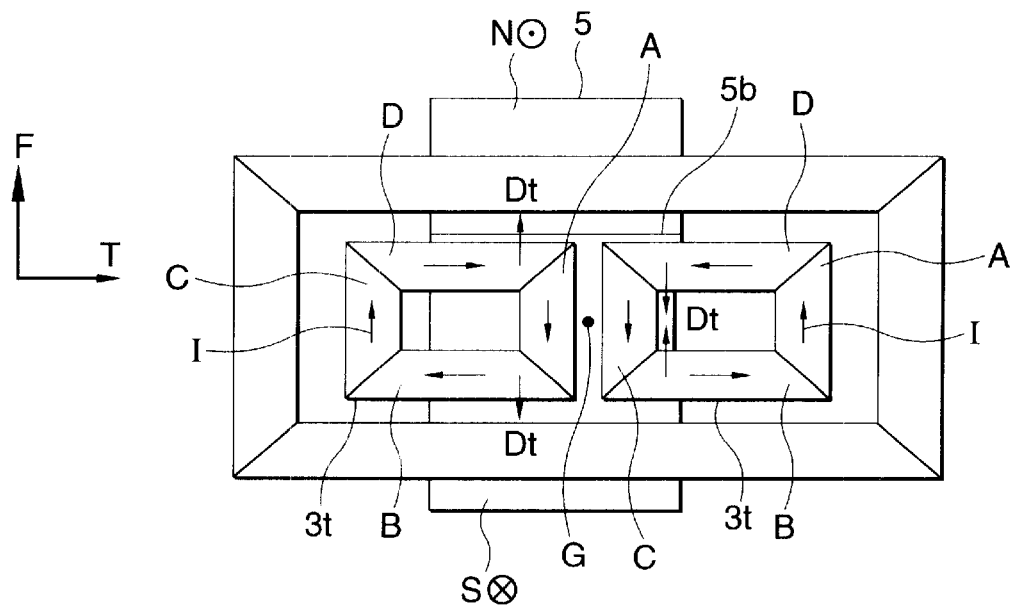
FIG. 4A is an arrangement plan showing the relationship between a magnet, a focus coil and tracking coils in the self-weight position as moved in the plus (+) tracking direction (rightward in the figure) according to the first embodiment of the invention.

In this position in the focusing direction F, feeding a current I across the tracking coil 3t as shown by an arrow in FIG. 4A causes the movable part including the coil unit 3 to be moved in the plus tracking direction T (rightward in the figure) via the current flowing through one vertical side A and the other vertical side C. At the same time, thrusts Dt in opposite directions as shown by arrows are generated in the horizontal sides B, D of the tracking coil 3t. These thrusts cancel each other as a moment about the center of the coil unit 3 (center of gravity of the movable part).

Figure 4B:
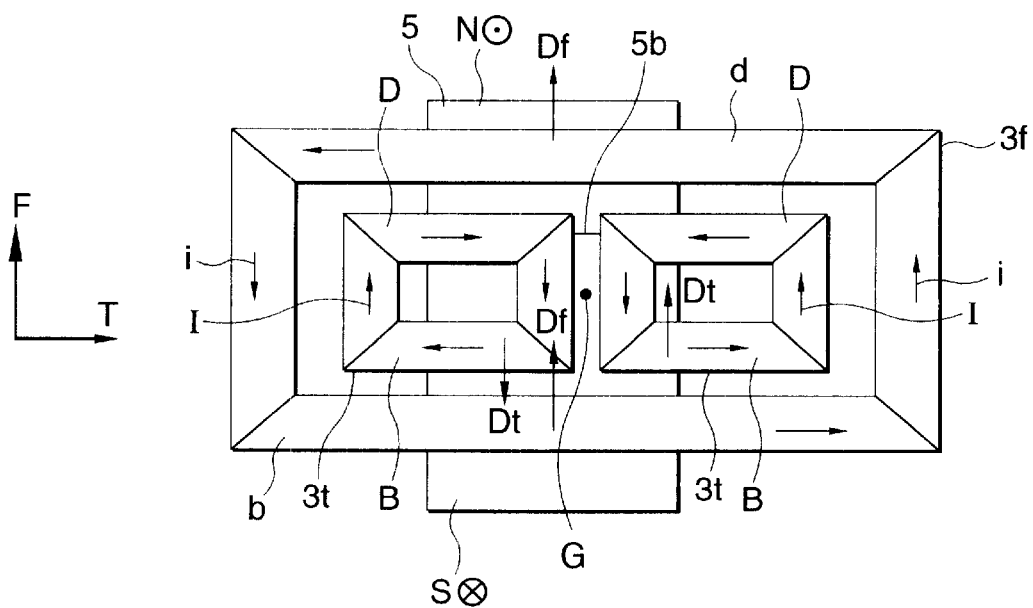
FIG. 4B is an arrangement plan showing the relationship between a magnet, a focus coil and tracking coils in the self-weight position as moved upward in the focusing direction while moved in the plus (+) tracking direction (rightward in the figure)
Figure 5:
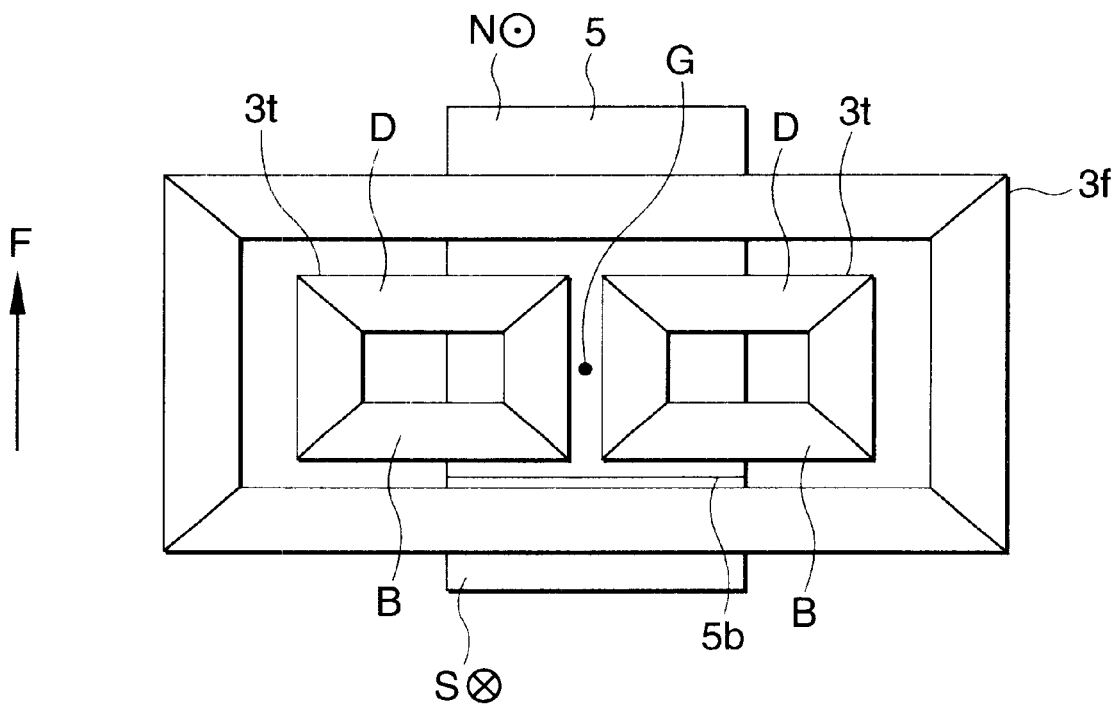
FIG. 5 is an arrangement plan showing the relationship between a magnet, a focus coil and tracking coils in the self-weight position in the focusing direction according to the first embodiment of the invention.

While the focus coil 3f is moved in the plus tracking direction T (rightward in the figure), feeding a current i across the focus coil 3f in order to move the objective lens upward in the focusing direction F as shown by an arrow in FIG. 4B generates a thrust Df in the focusing direction F via the current i flowing through the horizontal sides b, d and causes the movable part including the coil unit 3 to be moved upward in the focusing direction F (upward in the figure). In this case, the center of drive in the focusing direction F assumed as the center of the magnetic circuit of the fixed part is dislocated leftward from the center of the coil unit (center of gravity of the movable part G). This generates a moment via the thrust Df of the focus coil 3f in the focusing direction F, that is, a clockwise moment, thus causing the objective lens 2 to be inclined in the tracking direction T.

However, in case the boundary 5b between the north pole and the south pole of the magnet 5 falls within the width formed by the horizontal sides D of the tracking coils 3t, the north pole and the south pole of the magnet 5 are simultaneously positioned within the width within the width formed by the horizontal sides D so that the thrusts Dt in the focusing direction F in the horizontal sides D are canceled. On the other hand, in the horizontal sides B, the thrusts Dt are maintained.

Thus, the thrusts Dt in the focusing direction F generated in both horizontal sides B are greater than the thrusts in the focusing direction F generated in the horizontal sides D and directed in the opposite directions to each other. Thus, on the tracking coil 3t, a counterclockwise moment is generated having an approximately equal quantity as the moment via the thrust Df of the focus coil 3f in the focusing direction F. It is possible to use this moment to cancel the moment via the thrusts Df in the focusing direction F and sufficiently reduce the inclination of the objective lens 2 in the tracking direction T.

Tomove the objective lens upward in the focusing direction F while moved in the minus (−) tracking direction T (leftward in the figure), the moment via the thrust Df in the focusing direction F is counterclockwise and the moment generated by the tracking coil 3t is clockwise. Thus the two moments cancel each other.

The aforementioned configuration reduces the inclination of the objective lens 2 in the tracking direction T when the object lens 2 is moved upward in the focusing direction F while moved in the tracking direction T. To reduce the inclination of the objective lens 2 in the tracking direction T when the object lens 2 is moved downward in the focusing direction F, the boundary 5b between the north pole and the south pole of the magnet 5 is placed a little below the lower side B out of the horizontal sides B and D that are perpendicular to the focusing direction F of the tracking coil 3t.

In this case, a clockwise moment is generated on the tracking coil 3t opposite to the counter clockwise moment via the thrust Df of the focus coil 3f in the focusing direction F. It is possible to use this moment to cancel the moment via the thrusts Df in the focusing direction F and sufficiently reduce the inclination of the objective lens 2 in the tracking direction T.

Figure 6:
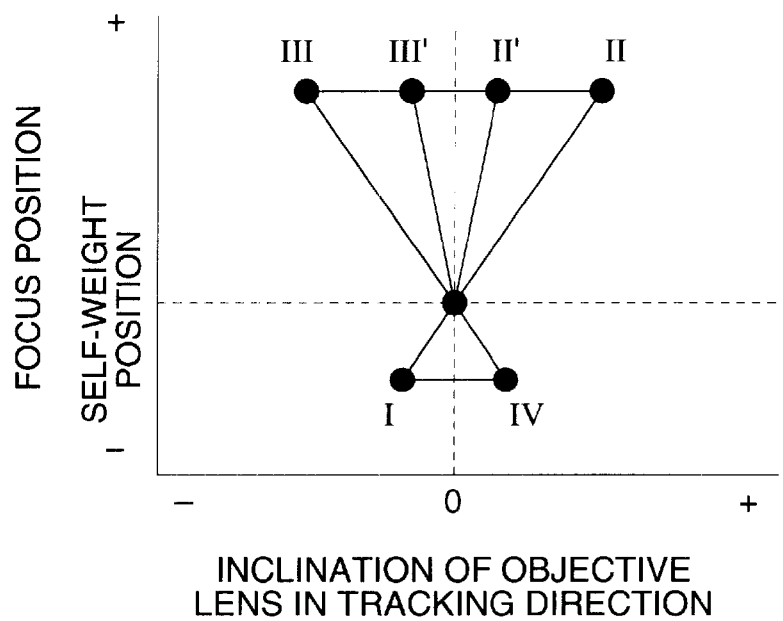
FIG. 6 is an explanatory drawing of the relationship between a focusing position in a given tracking coil position and the inclination of an objective lens according to the first embodiment of the invention.

Next, the relationship between the focus position and the inclination angle of the objective lens when moved in the tracking direction T by an arbitrary distance ±X, is explained with reference to FIG. 6. In an arbitrary tracking position ±X, the objective lens inclination angle is minus in case the focus position is in the minus direction from the self-weight position (moved downward in the focusing direction F) while the objective lens inclination angle is plus (line I-II) in case the focus position is in the plus direction from the self-weight position (moved upward in the focusing direction F). In the arbitrary tracking position −X, the opposite relationship applies (line IV-III).

According to this embodiment of the invention, it is possible to sufficiently reduce the inclination of the objective lens 2 in the tracking direction T, as shown by II' and III', by using a moment, generated by the horizontal side B of the tracking coil 3t, having an approximately equal quantity and opposite direction to the moment via the thrust Df of the focus coil 3f in the focusing direction F. Generation of coma aberration is reduced and the read signal jitter is improved.

Figure 7:
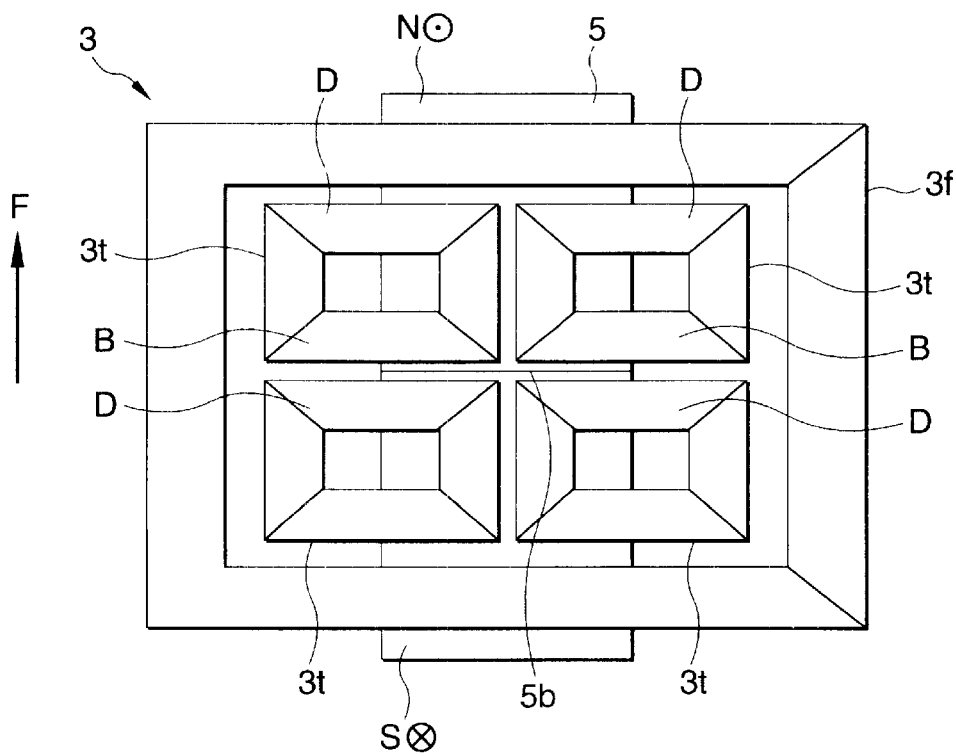
FIG. 7 is an arrangement plan showing the relationship between a magnet, a focus coil and tracking coils in the self-weight position in the focusing direction according to another example of the first embodiment of the invention.

In the aforementioned configuration, the coil unit 3 is composed of one focus coil 3f and two tracking coils 3t and the boundary 5b between the north pole and the south pole of the magnet 5 is placed a little above the upper side D or a little below the lower side B out of the horizontal sides B and D that are perpendicular to the focusing direction F of the tracking coil 3t. As shown in FIG. 7, another configuration is possible where the coil unit 3 is composed of four tracking coils 3t arranged in the tracking direction T in the hollow section of one focus coil 3f and arranged in the focusing direction F and where the magnet and the tracking coil are arranged so that the boundary 5b between the north pole and the south pole of the magnet 5 falls between the lower side B and the upper side D out of the horizontal sides B and D that are perpendicular to the focusing direction F of the tracking coil 3t, and the boundary 5b falls within the width formed by the upper sides D of the tracking coil 3t when the coil unit 3 is moved upward in the focusing direction F and within the width formed by the lower sides B of the tracking coil 3t when the coil unit 3 is moved downward in the focusing direction F. Via this configuration, it is possible to sufficiently reduce the inclination of the objective lens 2 both when the coil unit is moved upward and when it is moved downward from the self-weight position.

The relationship between the focus coil 3f and the tracking coil 3t is not limited to the relationship shown in FIG. 7. The coil unit may be composed of four tracking coils 3t arranged in the tracking direction T and arranged in the focusing direction F, and one focus coil 3f may be arranged on the tracking coils, in order to provide a low-profile design.

(Embodiment 2)

Figure 8:
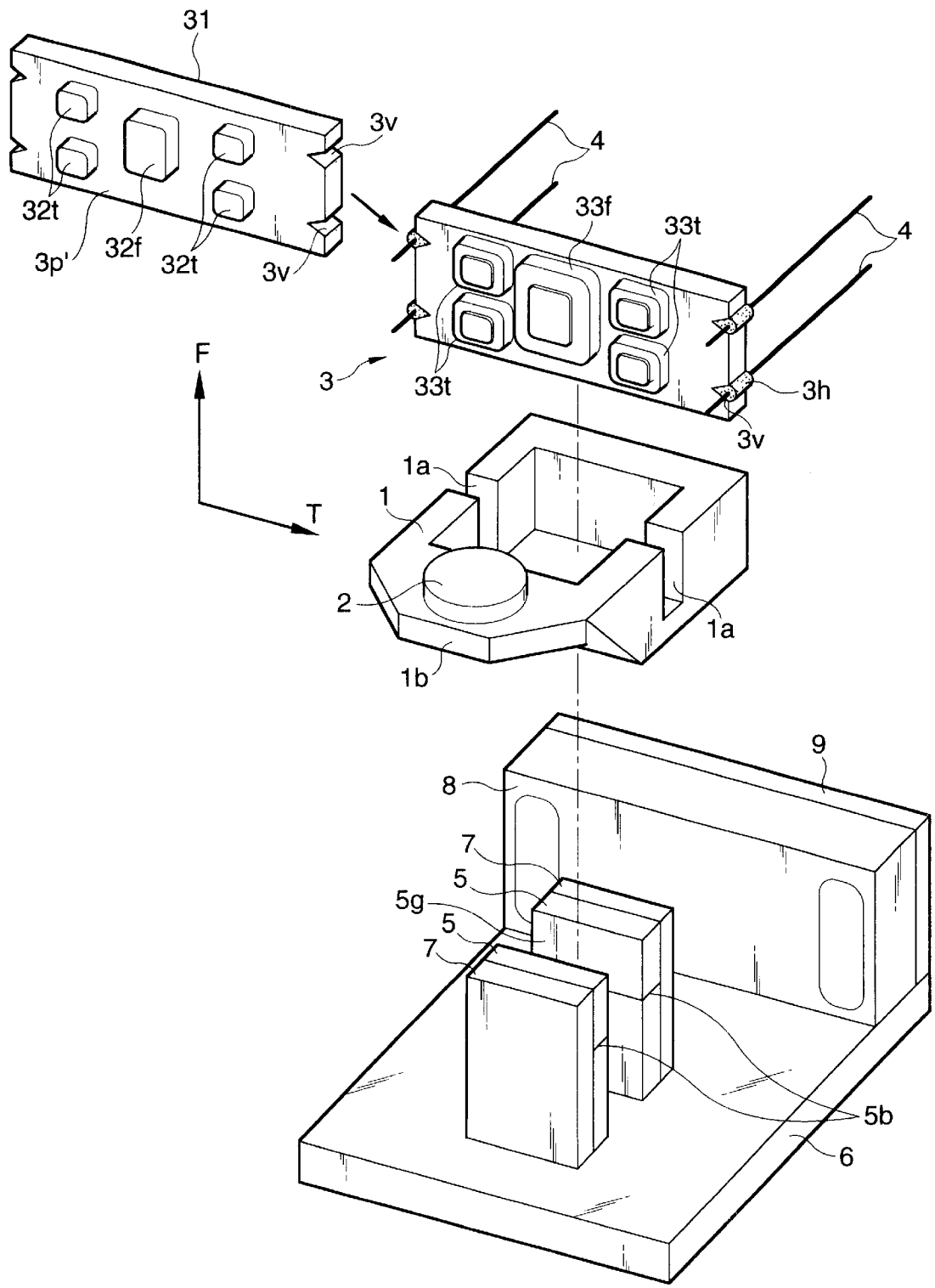
FIG. 8 is an exploded perspective view of a second embodiment of the invention.

FIG. 8 is a perspective view of a second embodiment of the invention. In FIG. 8, 1 represents a lens holder, 2 represents an objective lens, 3 represents a coil unit, 31 represents a coil seating, 32f represents a focus coil spool, 32t represents a tracking coil spool, 33f represents a focus coil, 33t represents a tracking coil, 5 represents a magnet, and 5g represents a magnetic gap.

In the lens holder 1, two notches 1a are formed in the tracking direction T. An objective lens attaching section 1b for holding the objective lens 2 is formed in uniform thickness.

The coil unit 3 according to the second embodiment is formed of a coil seating 31, one focus coil spool 32f and four tracking coil spools 32t protruding from the coil seating 31, one focus coil 33f and four tracking coils 33t wound around the focus coil spool 32f and the tracking coil spools 32t. A printed circuit board 3p' is used as a coil seating 31. The focus coil spool 32f is arranged in the center of the coil seating 31. Four tracking coil spools 32t are arranged about and outside the focus coil spool 32f symmetrically in vertical and horizontal directions. Thickness of the focus coil spool 32f and the tracking coil spool 32t is formed with the center in the direction of thickness matched. Via this configuration, the center of the drive force generated in the focusing direction F and the center of the drive force generated in the tracking direction T coincide with each other. The center of each of these drive forces coincides with the center of gravity of the movable part, because the focus coil spool 32f and the tracking coil spool 32t are arranged on the coil seating 31 composing the movable part as mentioned earlier.

In case the thickness of the focus coil 33f is the same as that of the tracking coil 33t, the thickness of focus coil spool 32f may be the same as that of the tracking coil spool 32t. In case the thickness of the focus coil 33f is not the same as that of the tracking coil 33t, the coil seating 31 must be provided with a difference in level so that the center in the coil thickness direction may be matched between the focus coil 33f and the tracking coil 33t.

Ends of the focus coil 33f and the tracking coil 33t are connected to a printed circuit board 3p' composing the coil seating 31 (not shown).

The coil unit 3 is fixed to the lens holder 1 with the coil seating 31 inserted and glued in the notches 1a. On both ends of the coil seating 31, four V-grooves 3v are formed in the tracking direction T, to which one end of each of the four conductive elastic members 4 is fixed via solder 3h. When an insulation protective film for insulation reinforcement is not formed on the surface of the notches 1a of the lens holder 1, an insulation protective film for insulation reinforcement (not shown) is formed on the section of the coil seating 31 to be attached to the notches 1a to secure insulation of the coil seating 31.

Figure 9:
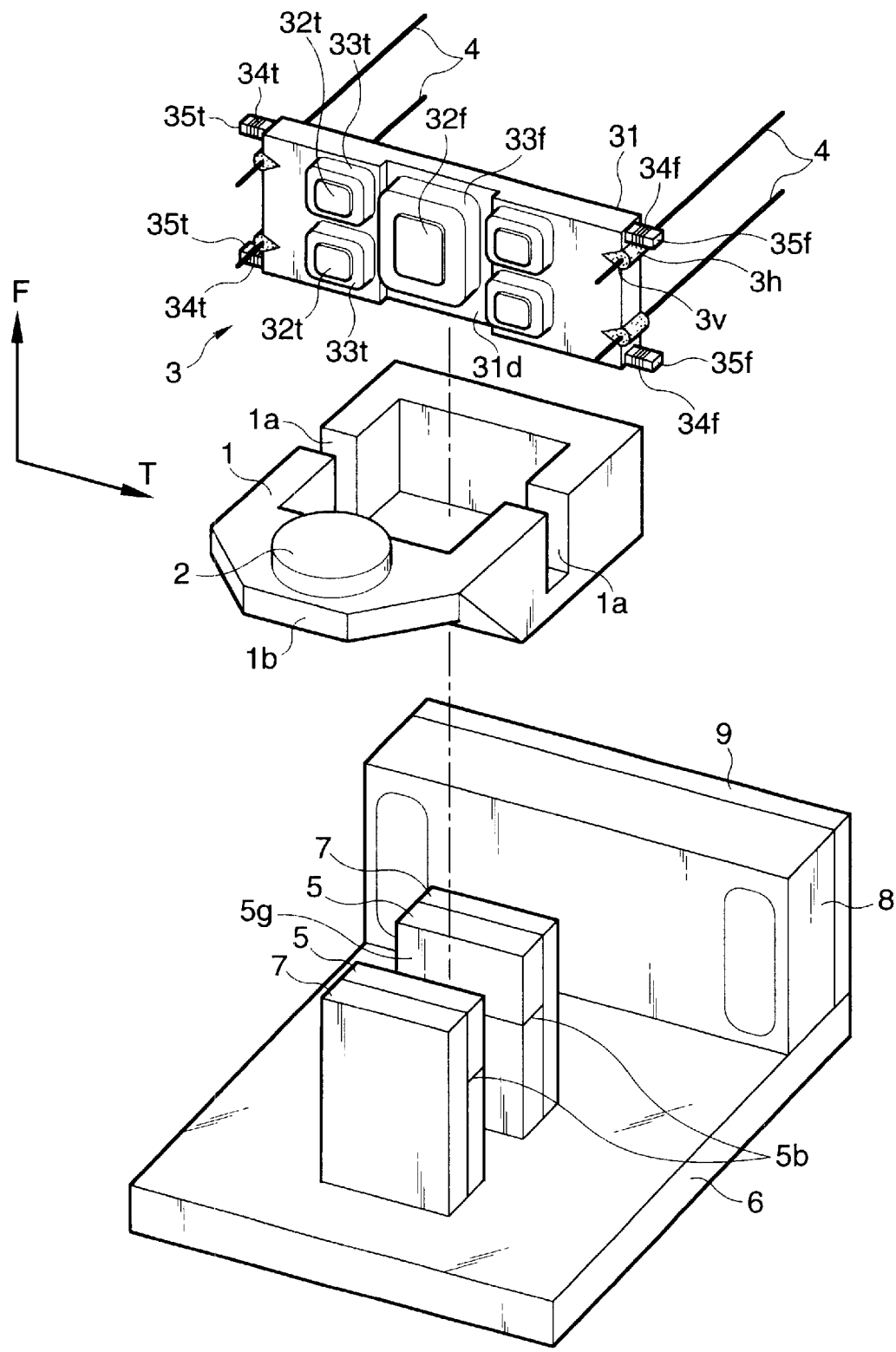
FIG. 9 is an exploded perspective view showing another example of the second embodiment of the invention.

While the aforementioned configuration uses a printed circuit board 3p' as a coil seating 31, another configuration is possible. As shown in FIG. 9, the coil seating 31 is formed of a heat resisting resin plate and at the top and the bottom of both ends of the coil seating 31 are provided protruding terminals 35f, 35t for winding the ends of leads 34f, 34t of the focus coil 33f and the tracking coils 33t. Since the focus coil 33f and the tracking coils 33t are wound around the focus coil spool 32f and the tracking coil spool 32t, no jigs dedicated for coils are required. Thus, winding around a plurality of focus coil spools 32f and the tracking coil spools 32t is allowed thus reducing the total winding time and forming a low-cost coil unit 3

In FIG. 9 also, the coil unit 3 is fixed to the lens holder 1 with the coil seating 31 inserted and glued into the notches 1a. On both ends of the coil seating 31 in the tracking direction T are formed V-grooves 3v, in which one end of each of the four conductive elastic members 4 is directly fixed to the ends 34f, 34t of the lead via solder 3h.

Figure 10:
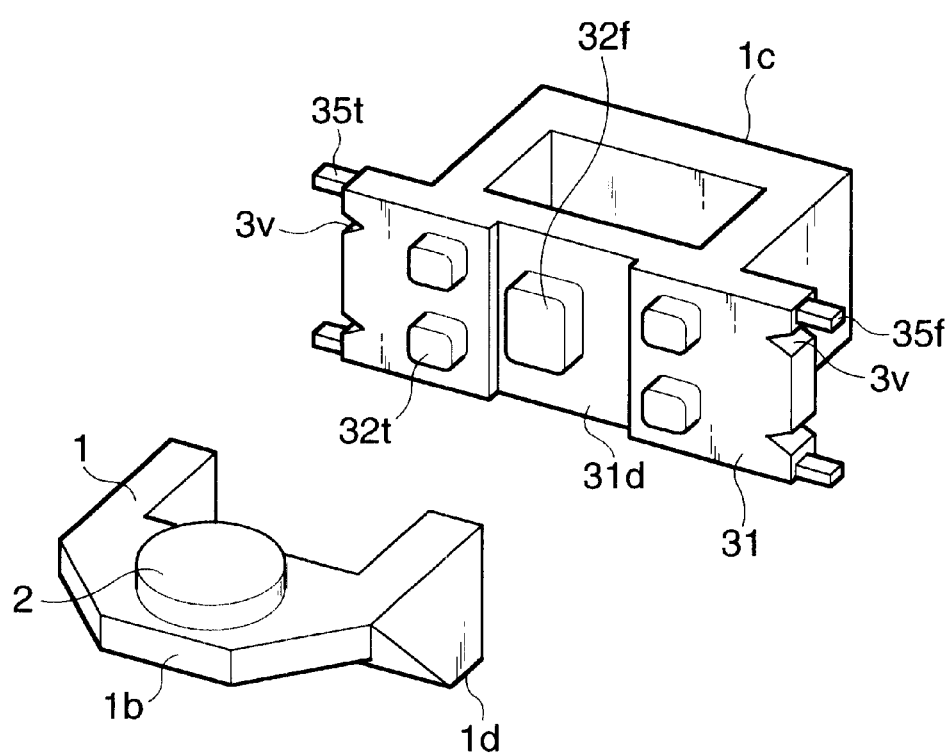
FIG. 10 is an exploded perspective view showing how to fix a coil seating and a lens holder according to the second embodiment of the invention.

In FIG. 9, the lens holder and the coil seating 31 are separately formed and the focus coil 33f and the tracking coils 33t are attached to a plurality of focus coil spools 32f and tracking coil spools 32t, then the coil seating 31 is fixed to the lens holder 1 while the coil seating 31 is inserted and glued into the notches 1a. As shown in FIG. 10, the non-attaching section 1c of the objective lens 2 of the lens holder and the coil seating 31 may be formed integrally and after the focus coil 33f and the tracking coils 33t (not shown) are attached, the attaching section 1d of the objective lens 2 of the lens holder may be glued and fixed to the coil seating 31. Further, the coil seating 31 and the attaching section 1d of the objective lens 2 may be formed integrally and after the focus coil 33f and the tracking coils 33t are attached, the non-attaching section 1c of the objective lens 2 of the lens holder 1 may be glued and fixed to the coil seating 31. (not shown) In this case, in order to attach the focus coil 33f and the tracking coils 33t, the focus coil spool 32f and the tracking coil spool 32t are oriented to the non-attaching section 1c, not the attaching section 1d, unlike in FIG. 10.

In FIGS. 9 and 10, since thickness differs between the focus coil 33f and tracking coils 33t, the coil seating 31 is provided with a difference in level so that the center in the coil thickness direction may be matched between the focus coil 33f and the tracking coils 33t.

While the aforementioned cases use four tracking coil spools 32t, arranging two tracking coil spools 32t about and outside the focus coil spool 32f symmetrically in vertical and horizontal directions can obtain the same advantage.

Figure 11:
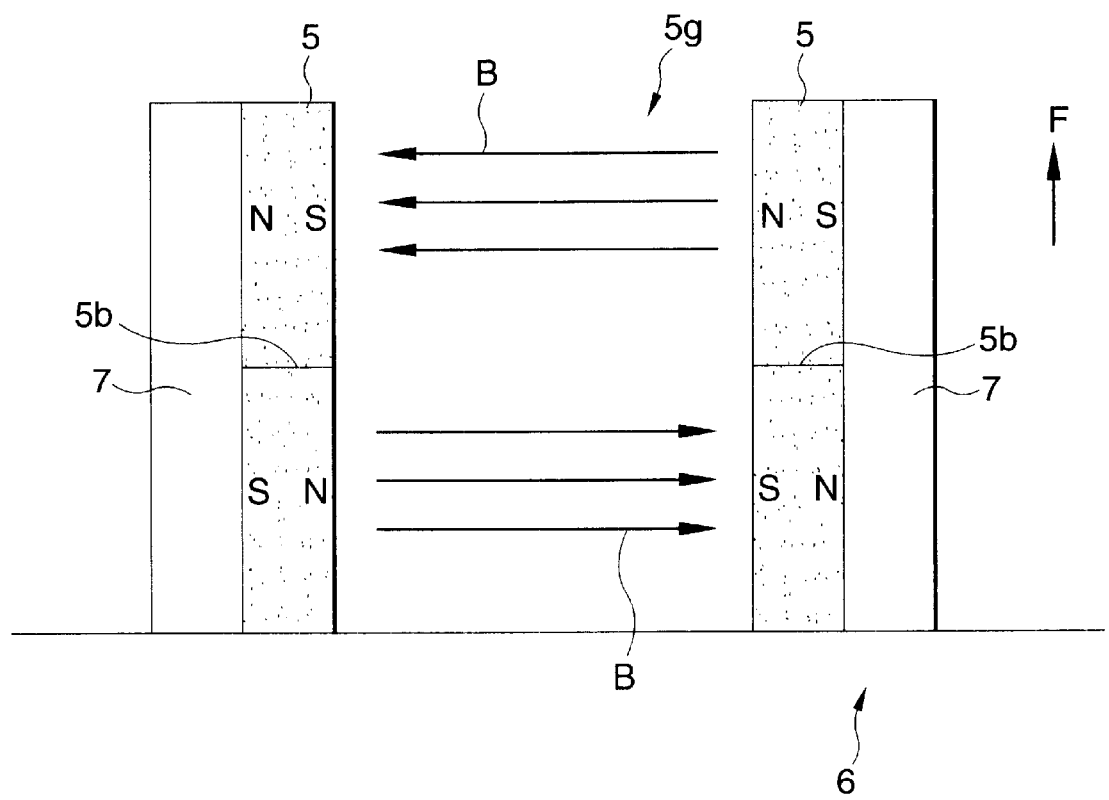
FIG. 11 is a side view of a magnetic circuit according to the second embodiment of the invention.

As shown in FIG. 11, the magnet 5 is polarized on two poles in the focusing direction F via a boundary 5b between the north pole and the south pole and glued to yokes 7 on a yoke base 6. Two magnets facing each other form a magnetic gap 5g. The direction of the line of magnetic force B is reversed in the focusing direction of the magnetic gap 5g. The magnet 5 may be composed of a single magnet.

Figure 12:
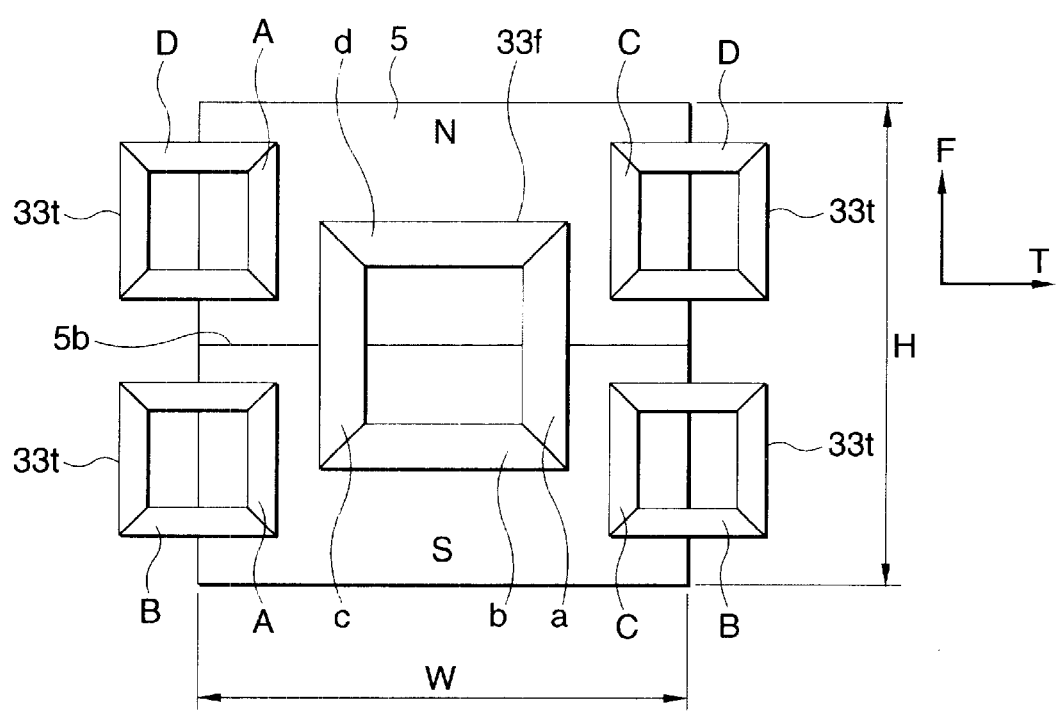
FIG. 12 is an arrangement plan showing the relationship between a magnet, a focus coil and tracking coils in the self-weight position in the focusing direction according to the second embodiment of the invention.

The width W of the magnet 5 is determined so that only the inner vertical sides A, C on the right and left out of the vertical sides that are parallel with the focusing direction F of the tracking coil 33t are arranged in the magnetic gap 5g (a gap within a width W of the magnets 5 facing each other) when the coil unit 3 is arranged in the magnetic gap 5g in the position of the movable part movably supported via a cantilever by the conductive elastic member, that is, the self-weight state in the focusing direction F, as shown in FIG. 12. The height H of the magnet 5 is determined so that the uppermost and lowermost horizontal sides B, D out of the horizontal sides that are perpendicular to the focusing direction F of the tracking coil 3t are arranged in the magnetic gap 5g (a gap within a height H of the magnets 5 facing each other). The boundary 5b between the north pole and the south pole of the magnet 5 falls within the width formed by the upper side B and the lower side D out of the horizontal sides B and D that are perpendicular to the focusing direction F of the tracking coil 33t, as shown in FIG. 12. The center of the magnet approximately coincides with the 156 center of the coil unit 3.

In FIG. 12, a current flowing through the vertical sides A, C that are parallel with the focusing direction F of the tracking coil 33t generates drive forces in the same direction in the tracking direction T.

In FIG. 12, all the sides of the focus coil 33f are arranged in a magnetic gap 3g, and the direction of the line of magnetic force is reversed in the focusing direction F of the magnetic gap 5g. Thus, in the horizontal sides b and d perpendicular to the focusing direction F of the focus coil 33f, only drive forces in the same direction in the focusing direction F are generated. This prevents one side of the focus coil 33f from generating a drive force and a moment in the opposite direction, influenced by a leak magnetic flux from the magnetic circuit. Thus the center of gravity of the movable part coincides with the center of the actual drive force.

The coil unit 3 is arranged in the magnetic gap 5g. The other end of the conductive elastic member 4 is fixed to a base board 9 via solder through a wire base 8. This supports the lens holder 1 movably in via a cantilever against the fixed part composed of the magnet 5, the yoke base 6, the yoke 7, the wire base 8, and the base board 9.

In such a configuration, energizing the focus coil 33f and the tracking coil 33t generates a drive force in the focusing direction F and the tracking direction T, thus allowing the objective lens 2 to be moved in the focusing direction F and the tracking direction T, in accordance with the surface deflection and decentering of a recording medium.

The aforementioned configuration uses square or rectangular flat plates as a focus coil spool 32f and tracking coil spools 32t and arranges two or four tracking coil spools 32t about and outside the focus coil spool 32f. Another configuration provides the same advantage where a square cylindrical flat plate is used as a focus coil spool 32f and in the hollow section thereof two (see FIGS. 13, 14) or four (see FIG. 15) tracking coil spools 32t are arranged.

Figure 13:
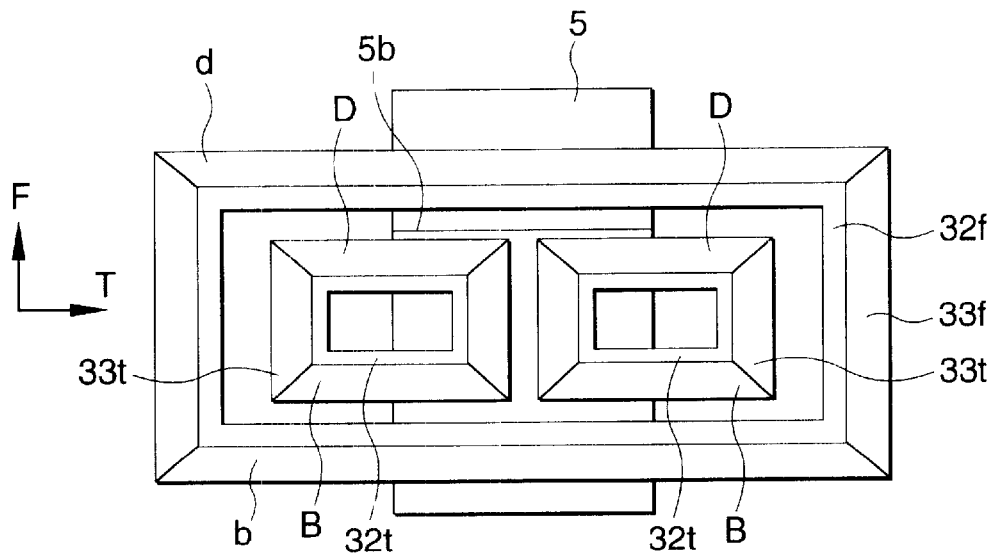
FIG. 13 is an arrangement plan showing the relationship between a magnet, a focus coil and tracking coils in the self-weight position in the focusing direction according to another example of the second embodiment of the invention.

In FIG. 13, the boundary between the north pole and the south pole of the magnet 5 is placed a little above the upper side D out of the horizontal sides B and D that are perpendicular to the focusing direction F of the tracking coil 33t. Of the focus coil 33f, only the center of the horizontal sides b, d perpendicular to the focusing direction F is arranged within the magnetic gap 5g. Of the two tracking coils 3t, only the right half of one and the left half of the other are arranged in the magnetic gap 5g.

Figure 14:
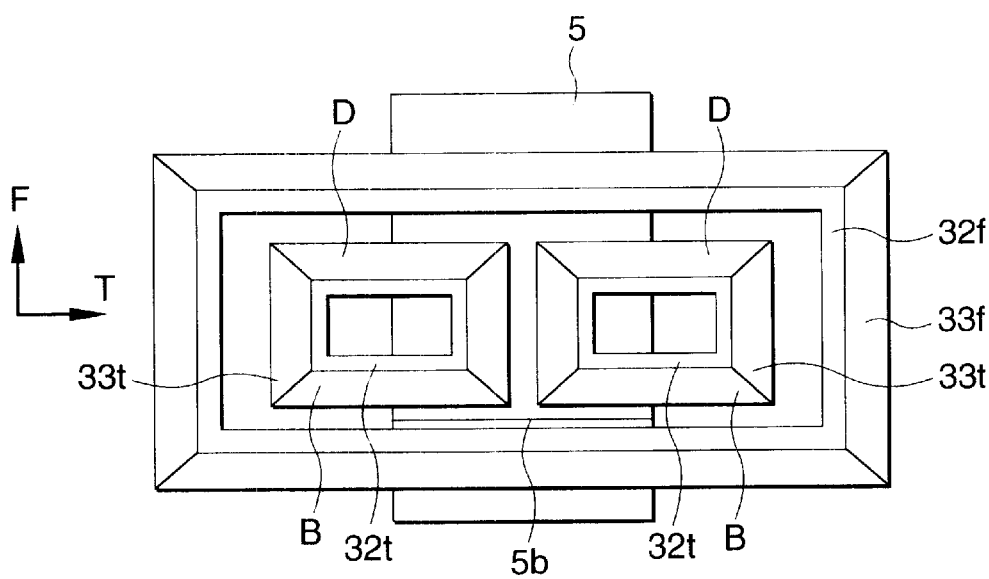
FIG. 14 is an arrangement plan showing the relationship between a magnet, a focus coil and tracking coils in the self-weight position in the focusing direction according to another example of the second embodiment of the invention.

In FIG. 14, unlike in FIG. 13, the boundary 5b between the north pole and the south pole of the magnet 5 is placed a little below the lower side B out of the horizontal sides B and D that are perpendicular to the focusing direction F of the tracking coil 3t.

Figure 15:
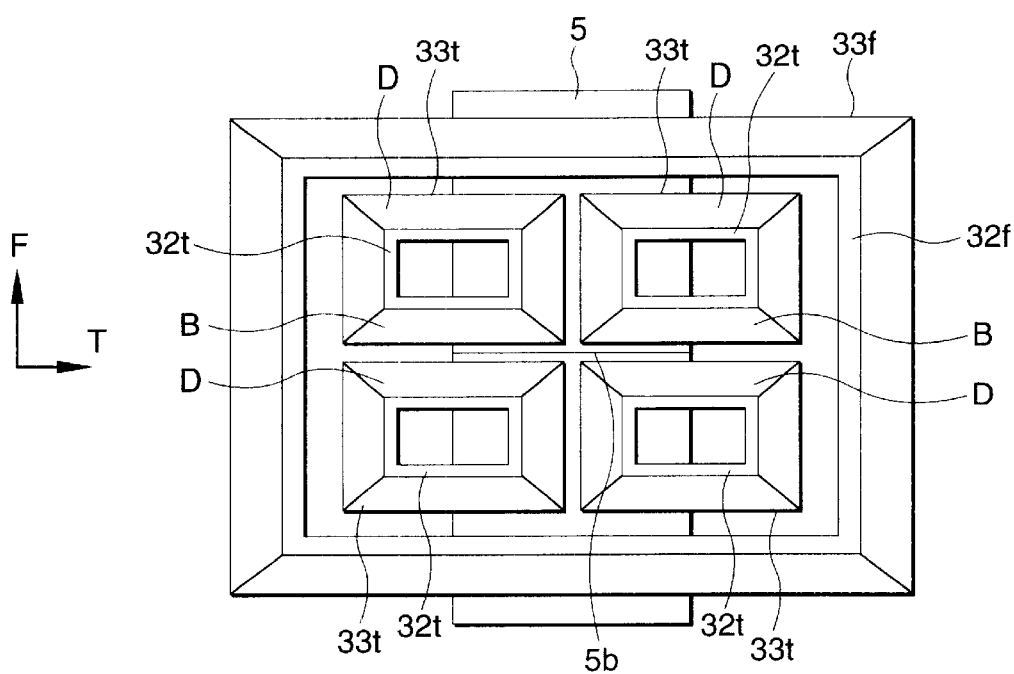
FIG. 15 is an arrangement plan showing the relationship between a magnet, a focus coil and tracking coils in the self-weight position in the focusing direction according to another example of the second embodiment of the invention.

In FIG. 15, unlike in FIGS. 13 and 14, the coil unit 3 is composed of four tracking coils 3t arranged in the tracking direction T in the hollow section of one focus coil 3f and arranged in the focusing direction F and the boundary 5b between the north pole and the south pole of the magnet 5 arranged in the middle of the width formed by the lower side B and the upper side D out of the horizontal sides B and D that are perpendicular to the focusing direction F of the tracking coil 3t.

While the aforementioned configuration uses square, rectangular, or square cylindrical flat plates as a focus coil spool 32f and tracking coil spools 32t, rod bodies may be arranged in the four corners instead of flat plates.

(Embodiment 3)

Figure 16:
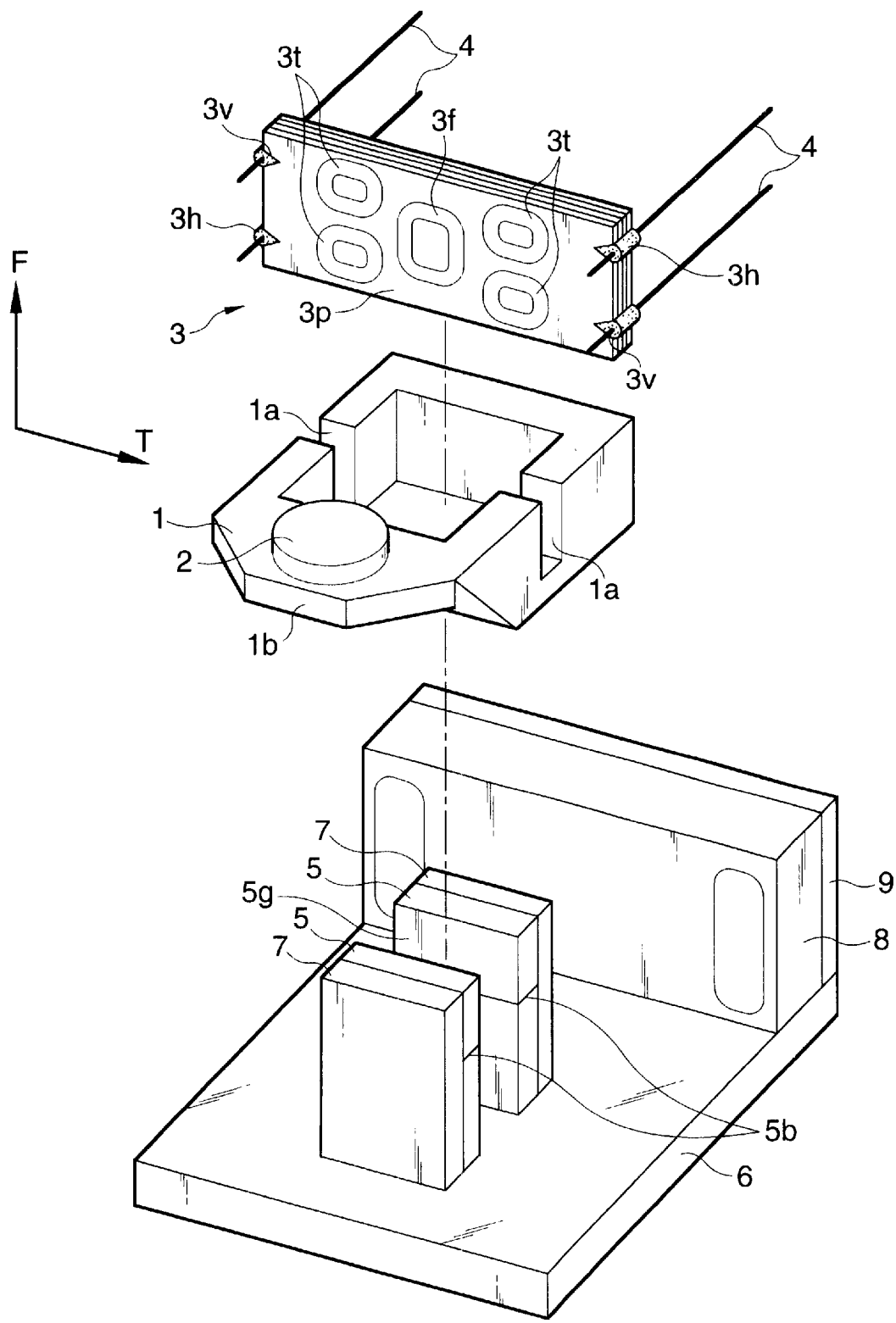
FIG. 16 is an exploded perspective view of a third embodiment of the invention.

FIG. 16 is a perspective view of a third embodiment of the invention. In FIG. 16, 1 represents a lens holder, 1a represents notches, 1b represents an objective lens attaching section, 2 represents an objective lens, and 3 represents a coil unit.

The lens holder 1 is formed of a resin containing a light metal such as a magnesium alloy or a carbon fiber with high flexural elasticity modulus. Use of such a material provides the lens holder 1 itself with a higher flexural elasticity modulus and raises the high-order resonance frequency. This allows a lens holder to support high-speed optical disk apparatus.

In the lens holder 1, two notches 1a are formed in the tracking direction T. An objective lens attaching section 1b for holding the objective lens 2 is formed in uniform thickness. Raised flexural elasticity modulus of the lens holder 1 itself has allowed the objective lens attaching section 1b to be uniform in thickness. Thus, the mirror arranged beneath the objective lens 2 need not be lowered. This provides a low-profile design of the entire optical pickup.

The notches 1a have an insulation protective film for insulation reinforcement formed thereon. This is to ensure insulation of the coil unit 3 attached in the notches 1a because a resin containing a light metal such as a magnesium alloy or a carbon fiber with high flexural elasticity modulus is used for the lens holder 1. When an insulation protective film for insulation reinforcement is not formed on the surface of the notches 1a of the lens holder 1, an insulation protective film for insulation reinforcement (not shown) is formed on the section of the coil seating 31 to be attached to the notches 1a to secure insulation of the coil unit 3.

The coil unit 3 is formed of necessary number of laminated At printed circuit boards 3p where one focus coil 3f and four tracking coils 3t are formed. The focus coil 3f is arranged in the center of the printed circuit board 3p and the four tracking coils 3t are arranged at the top and bottom of both ends of the coil unit 3f. Two tracking coils 3f may be used.

The coil unit 3 is inserted and glued to the notches 1a and fixed to the lens holder 1. On both ends of the coil unit 3 in the tracking direction T, four V-grooves 3v are formed, to which one end of each of the four conductive elastic bodies 4 is fixed via solder 3h.

Figure 17:
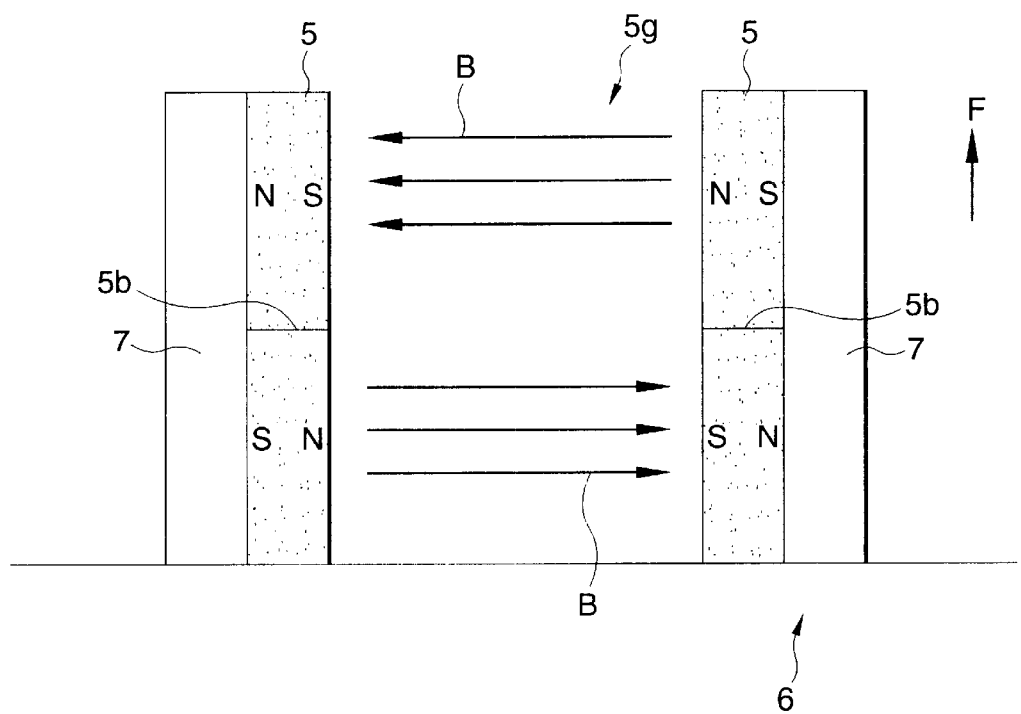
FIG. 17 is a side view of a magnetic circuit according to the third embodiment of the invention.

As shown in FIG. 17, the magnet 5 is polarized on two poles in the focusing direction F via a boundary 5b between the north pole and the south pole and glued to yokes 7 on a yoke base 6. Two magnets facing each other form a magnetic gap 5g. The direction of the line of magnetic force B is reversed in the focusing direction of the magnetic gap 5g. The magnet 5 may be composed of a single magnet.

Figure 18:
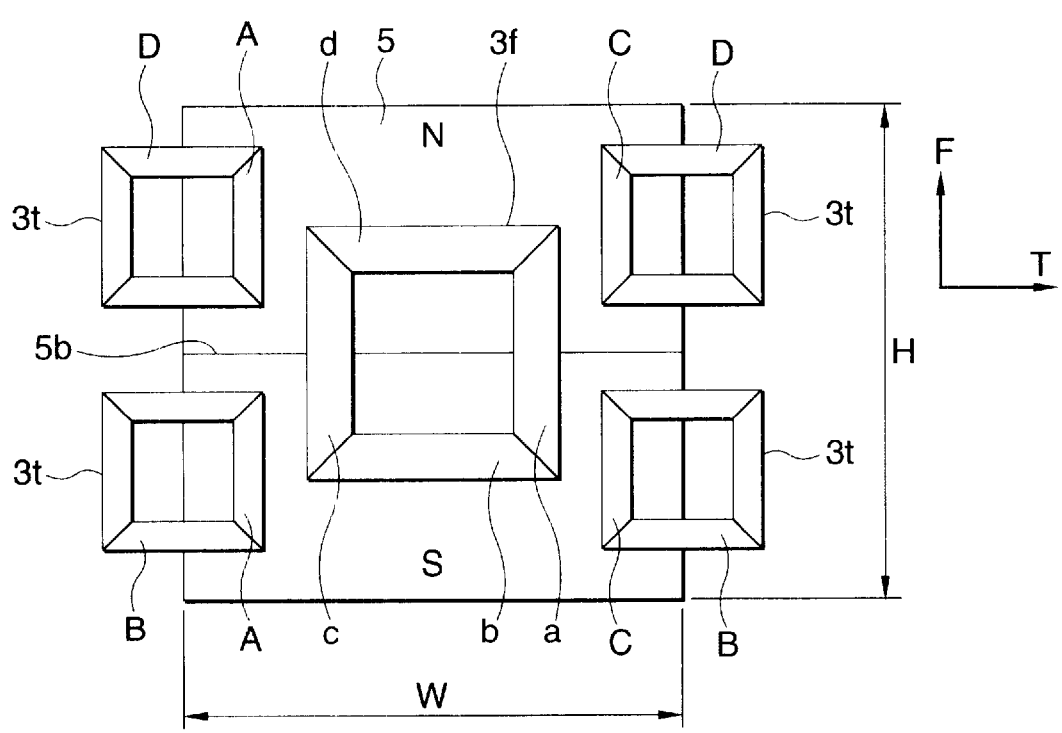
FIG. 18 is an arrangement plan showing the relationship between a magnet, a focus coil and tracking coils in the self-weight position in the focusing direction according to the third embodiment of the invention.
Figure 19:
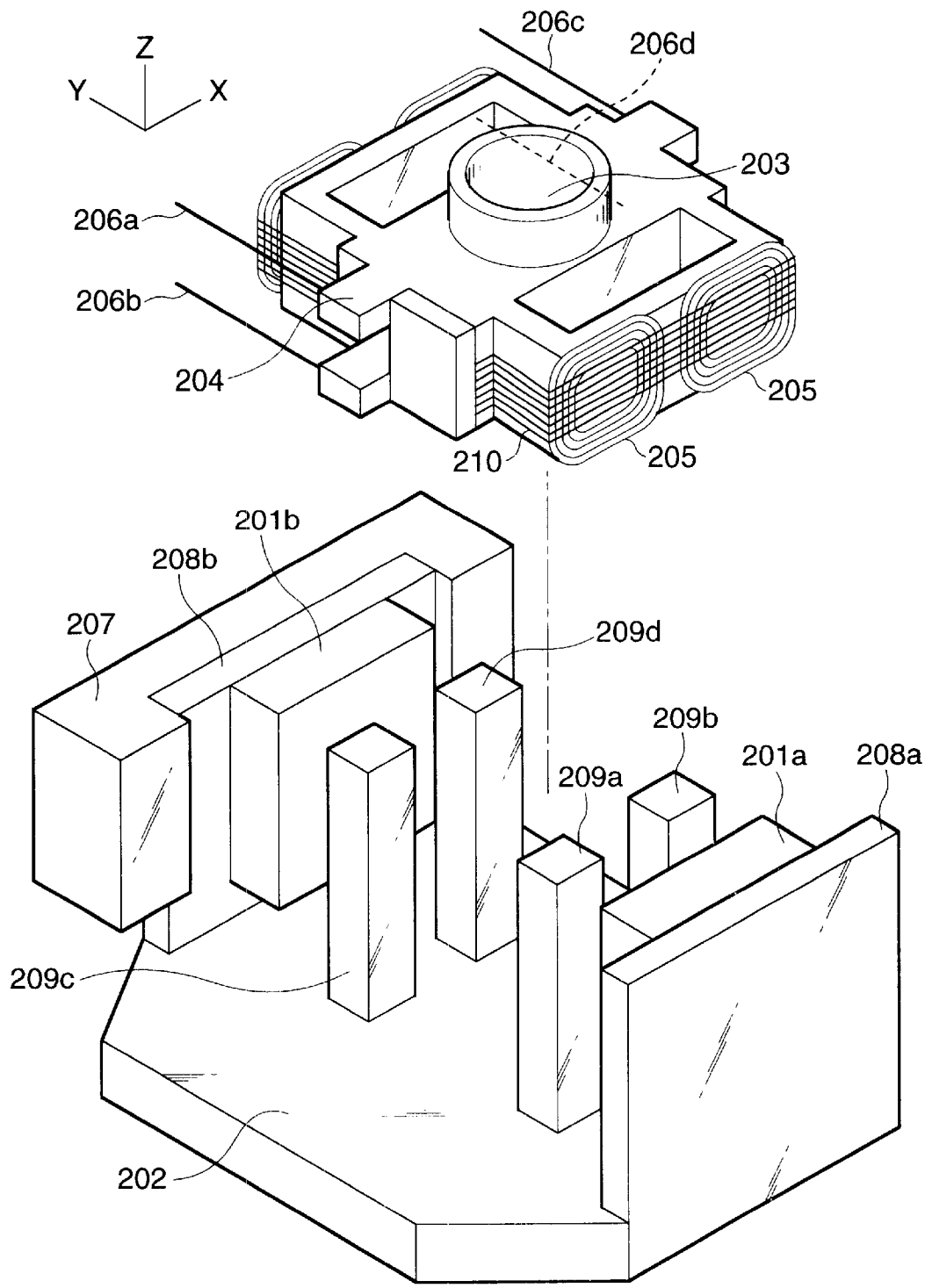
FIG. 19 is a perspective view showing a configuration of an example of the related art.
Figure 20A:
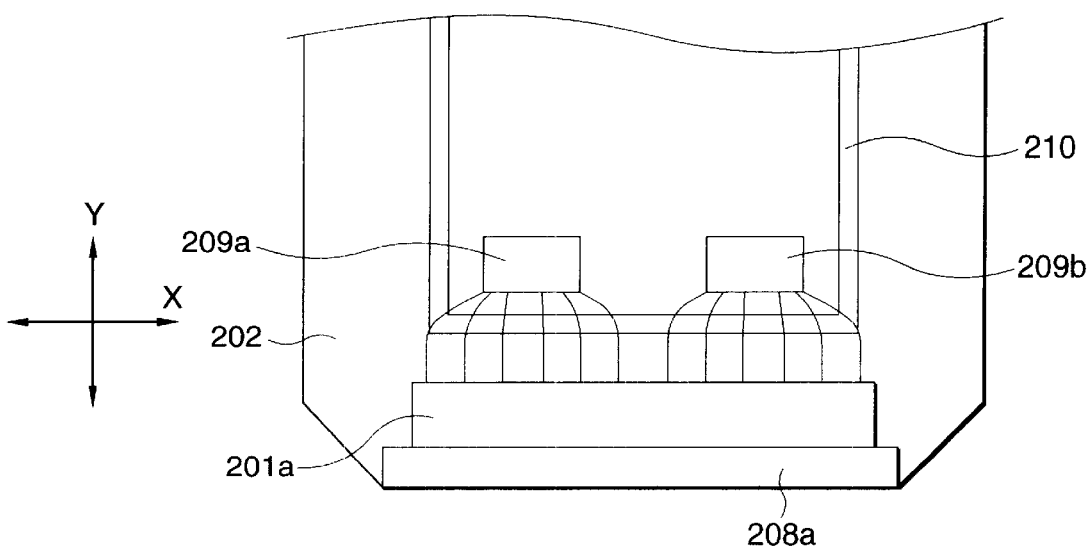
FIG. 20A is a plan view of magnetic circuit according to a second embodiment of the related art.
Figure 20B:
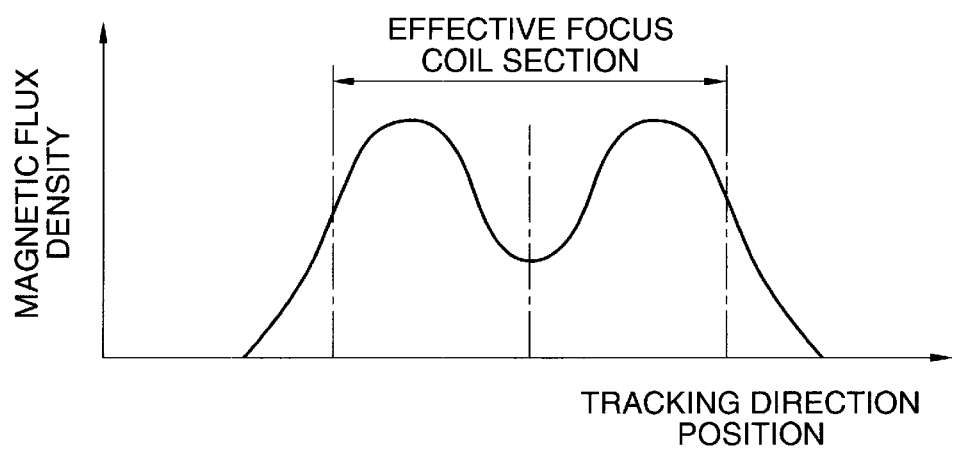
FIG. 20B shows distribution of a magnetic flux density penetrating the focusing drive coil.
Figure 21:
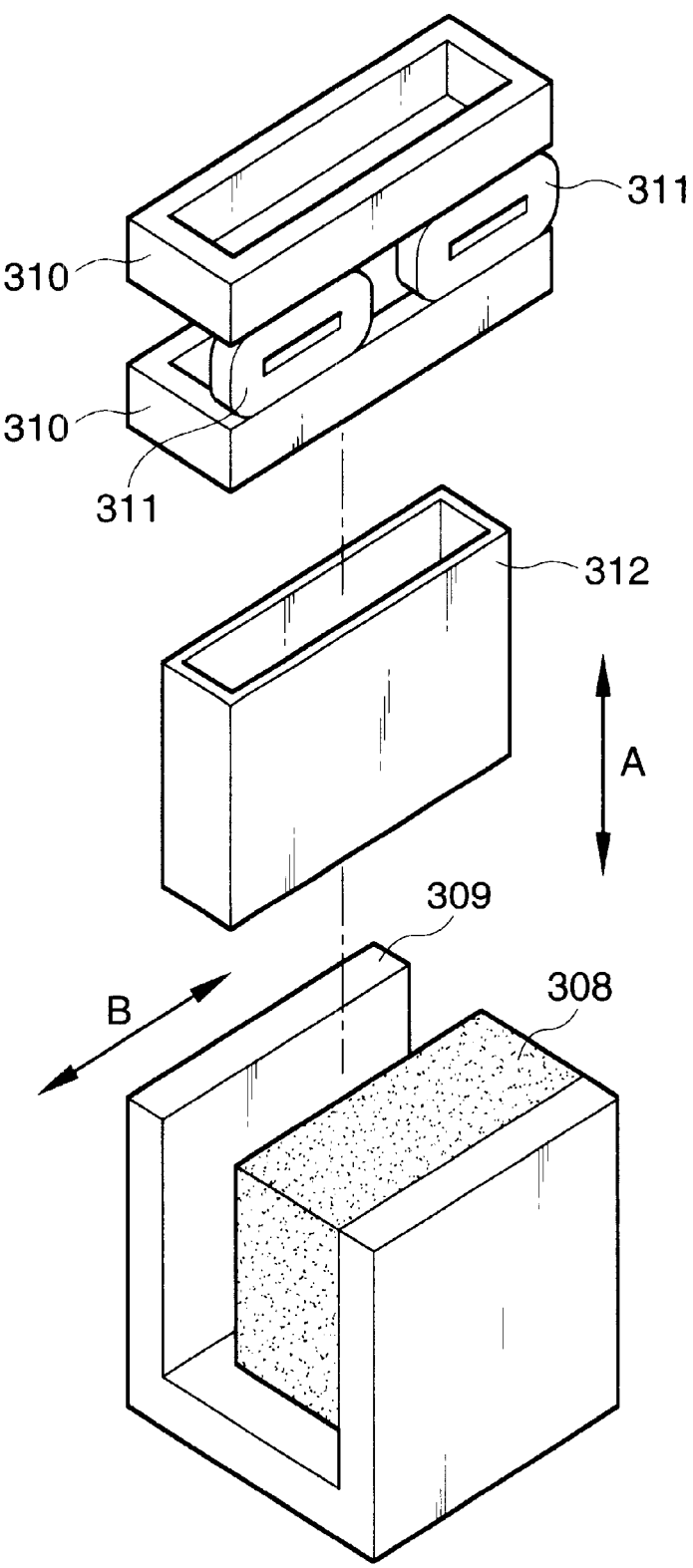
FIG. 21 is a perspective view of a third embodiment of the related art.
Figure 22:
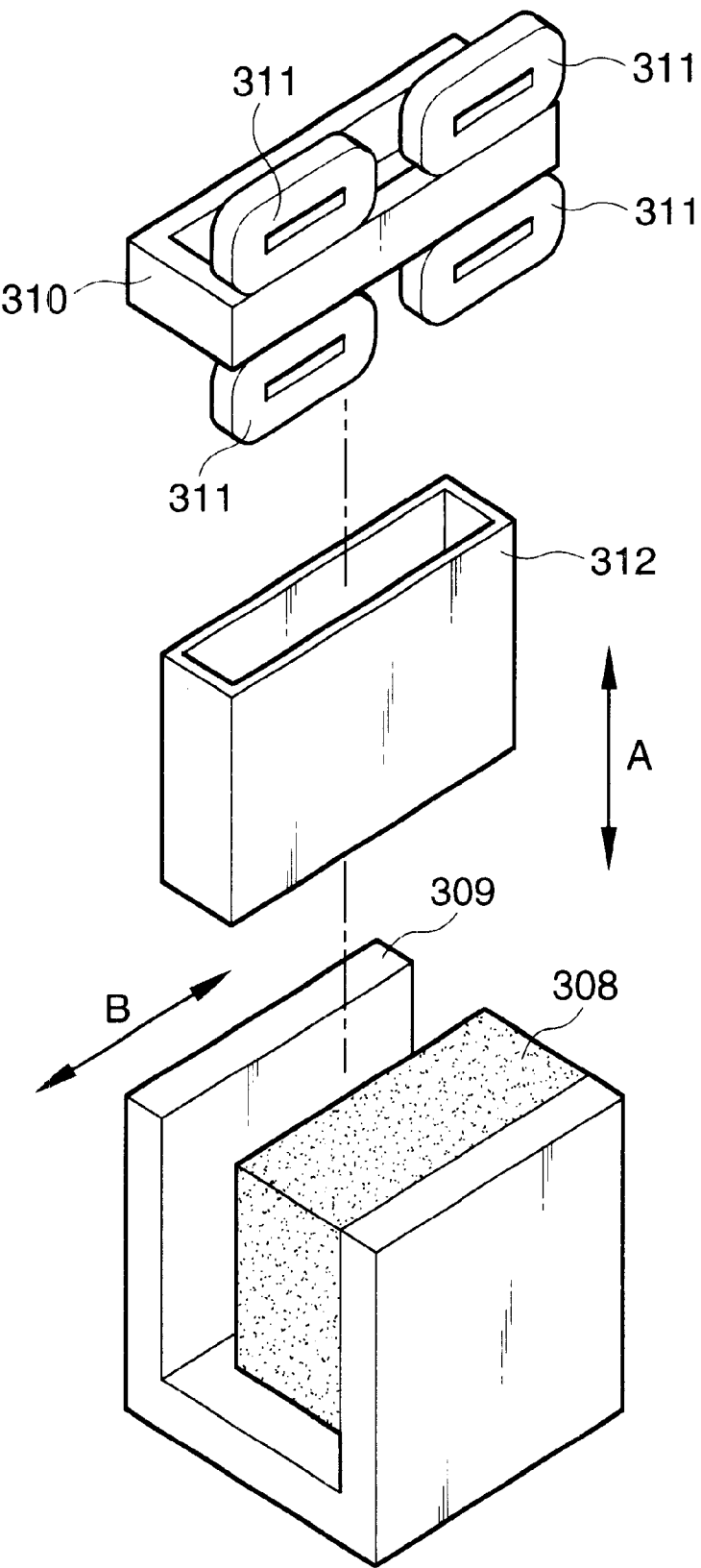
FIG. 22 is a perspective view of another third embodiment of the related art.
Figure 23:
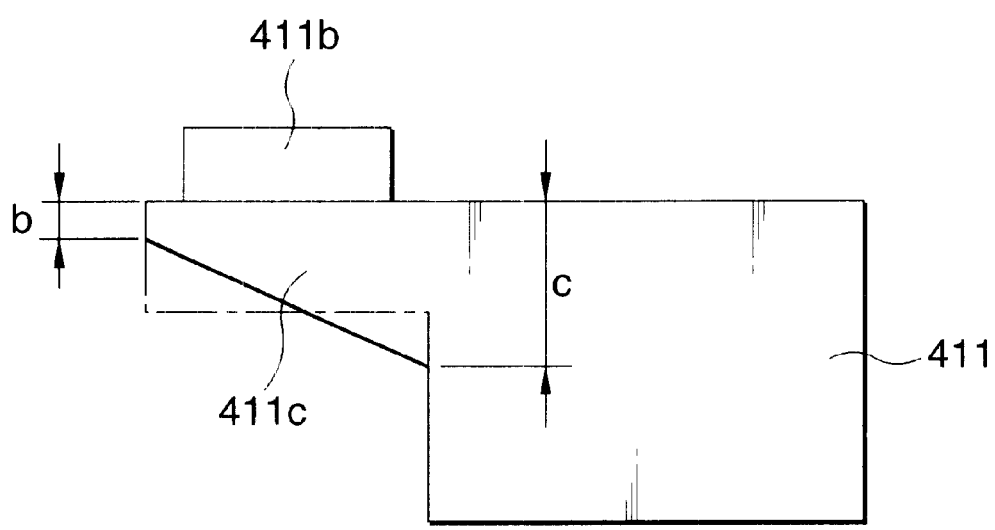
FIG. 23 shows a fourth embodiment of the related art.

The width W of the magnet 5 is determined so that only the inner vertical sides A, C on the right and left out of the vertical sides that are parallel with the focusing direction F of the tracking coil 3t are arranged in the magnetic gap 5g (a gap within a width W of the magnets 5 facing each other) when the coil unit 3 is arranged in the magnetic gap 5g in the position of the movable part movably supported via a cantilever by the conductive elastic member, that is, the self-weight state in the focusing direction F, as shown in FIG. 18. The height H of the magnet 5 is determined so that the uppermost and lowermost horizontal sides B, D out of the horizontal sides that are that are perpendicular to the focusing direction F of the tracking coil 3t are arranged in the magnetic gap 5g (a gap within a height H of the magnets 5 facing each other). The boundary 5b between the north pole and the south pole of the magnet 5 falls within the width formed by the upper side B and the lower side D out of the horizontal sides B and D that are perpendicular to the focusing direction F of the tracking coil 3t, as shown in FIG. 18. The center of the magnet approximately coincides with the center of the coil unit 3.

In FIG. 18, a current flowing through the vertical sides A, C that are parallel with the focusing direction F of the tracking coil 3t generates drive forces in the same direction in the tracking direction T. A current flowing through the horizontal sides b, d that are perpendicular to the focusing direction F of the focus coil 3f generates drive forces in the same direction in the focusing direction F.

The coil unit 3 is arranged in the magnetic gap 5g. The other end of the conductive elastic member 4 is fixed to a base board 9 via solder through a wire base 8. This supports the lens holder 1 movably in via a cantilever against the fixed part composed of the magnet 5, the yoke base 6, the yoke 7, the wire base 8, and the base board 9.

In such a configuration, energizing the focus coil 3f and the tracking coil 3t generates a drive force in the focusing direction F and the tracking direction T, thus allowing the objective lens 2 to be moved in the focusing direction F and the tracking direction T, in accordance with the surface deflection and decentering of a recording medium.

In the aforementioned configuration, notches 1a are formed in the lens holder 1 and the coil unit 3 is inserted and glued to the notches 1a and fixed to the lens holder 1. Attaching the coil unit 3 to the lens holder 31 via insert mold provides the same advantage. In this case also, an insulation protective film for insulation reinforcement is formed on the section of the coil unit 3 to be attached via insert molding to the lens holder 1 to secure insulation of the coil unit 3. Insert mold upgrades the accuracy of position during assembling and no adhesives are required.

The lens holder 1 formed of a resin containing a light metal such as a magnesium alloy or a carbon fiber with high flexural elasticity modulus according to the third embodiment may be used as a lens holder in the first and second embodiments. In this case also, same as this embodiment, it is desirable to form an insulation protective film for insulation reinforcement (not shown) on the surface of the notches 1a or on the section of the coil unit 3 to be attached to the notches 1a to secure insulation of the coil unit 3.

As mentioned earlier, according to the invention, a coil unit on which a focus coil and tracking coils are formed is arranged in a magnetic gap of a magnetic circuit containing one magnet polarized on two poles in the focusing direction F and the magnet and the tracking coils are arranged so that the boundary 5b between the north pole and the south pole of the magnet falls within the width formed by the horizontal sides of the tracking coil 3t in the focusing direction, the horizontal sides is perpendicular to the focusing direction, when the coil unit is moved in the focusing direction F. In such a configuration, the magnet is formed on two poles polarized in the focusing direction so that the magnetic circuit has a simple shape. On the tracking coil is generated a moment having an approximately equal quantity to that of a moment caused by a thrust of a focus coil in the focusing direction and in the opposite direction to that of the latter moment. This sufficiently reduces the inclination of an objective lens in the tracking direction. Thus, according to the invention, it is not necessary to provide a magnetic circuit having a complicated shape. Further, generation of coma aberration is reduced and the read signal jitter is improved.

According to the invention, a focus coil and tracking coils are attached to a coil seating with the center in the coil thickness direction matched and the focus coil is arranged in a magnetic gap of a magnetic circuit containing one magnet polarized on two poles in the focusing direction. Thus, the center of a drive force generated in the focusing direction coincides with the center of a drive force generated in the tracking direction and the center of gravity of a movable part. The focus coil generates only drive forces in the same direction. As a result, according to the invention, the center of gravity of the movable part coincides with the center of the actual drive force.

Further, according to the invention, a lens holder is formed of a resin containing a light metal such as a magnesium alloy or a carbon fiber with high flexural elasticity modulus, and a coil unit is attached to two notches formed in the lens holder in the tracking direction. This configuration provides the lens holder itself with a higher flexural elasticity modulus and raises the high-order resonance frequency, thus eliminating the need for lowering the mirror arranged beneath the objective lens. Thus, according to the invention, it is possible to support high-speed optical disk apparatus and to provide a low-profile design of the entire optical pickup.

What is claimed is:

1. An objective lens drive device of an optical pickup comprising:

a magnetic circuit including a magnet having two opposite poles in a focusing direction, the magnet forming a magnetic gap; and a coil unit having a focus coil and a plurality of tracking coils positioned in a tracking direction, the coil unit being positioned in the magnetic gap, wherein the magnet and plurality of tracking coils are positioned such that the two opposite poles have a boundary falling within the width formed by the horizontal sides of the plurality of tracking coils in the focusing direction, and the horizontal sides are perpendicular to a focusing direction, when the coil unit is moved in the focusing direction.

2. An objective lens drive device of an optical pickup according to claim 1, wherein:

the plurality of tracking coils comprises two tracking coils arranged in the tracking direction; and the boundary between the two opposite poles is placed above the upper side of the plurality of tracking coils, the upper side is perpendicular to the focusing direction.

3. An objective lens drive device of an optical pickup according to claim 1, wherein:

the plurality of tracking coils comprises two tracking coils arranged in the tracking direction; and the boundary between the two opposite poles is placed below the lower side of the plurality of tracking coils, the lower side is perpendicular to the focusing direction.

4. An objective lens drive device of an optical pickup comprising:

a magnetic circuit including a magnet having two opposite poles in a focusing direction, the magnet forming a magnetic gap; and a coil unit having a focus coil and a plurality of tracking coils positioned in a tracking direction, the coil unit being positioned in the magnetic gap, wherein the magnet and plurality of tracking coils are positioned such that the two opposite poles have a boundary falling within the width formed by the lower horizontal sides of the plurality of tracking coils in the focusing direction when the coil unit is moved upward in the focusing direction, and wherein the magnet and plurality of tracking coils are positioned such that the boundary of the two opposite poles of the magnet falls within the width formed by the upper horizontal sides of the plurality of tracking coils in the focusing direction when the coil unit is moved downward in the focusing direction.

5. An objective lens drive device of an optical pickup according to claim 4, wherein:

the plurality of tracking coils comprises four tracking coils arranged in the tracking direction and the focusing direction inside the focusing coil;

the boundary falls between the lower horizontal sides and the upper horizontal sides that are perpendicular to the focusing direction.

6. An objective lens drive device of an optical pickup according to claim 4, wherein:

the plurality of tracking coils comprises four tracking coils arranged in the tracking direction and focusing direction, the focus coil is arranged on top of the four tracking coils, the boundary falls between the lower horizontal sides and the upper horizontal sides that are perpendicular to the focusing direction.

7. An objective lens drive of an optical pickup comprising:

a magnetic circuit having a magnetic gap;

a coil unit movably positioned in the magnetic gap and including a focus coil and at least one tracking coil, wherein the focus coil and the at least one tracking coil have centers in a coil thickness direction which are positioned to be on the same plane.

8. An objective lens drive device of an optical pickup according to claim 7, wherein the coil unit has a coil seating for the focus coil and the at least one tracking coil, and the focus coil and at least one tracking coil are wound around a focus coil spool and at least one tracking coil spool protruding from the coil seating, respectively.

9. An objective lens drive device of an optical pickup according to claim 7, wherein the magnetic circuit includes a plurality of magnets each having two opposite poles in a focusing direction, and the plurality of magnets are positioned to form the magnetic gap of the magnetic circuit.

10. An objective lens drive device of an optical pickup according to claim 9, wherein the coil unit has a coil seating for the focus coil and the at least one tracking coil, the focus coil and at least one tracking coil are wound around a focus coil spool and at least one tracking coil spool protruding from the coil seating, respectively, and the focus coil spool and at least one tracking coil spool have centers in the thickness direction which are positioned to be on the same plane.

11. An objective lens drive device of an optical pickup according to claim 10, wherein the coil seating comprises a printed circuit board.

12. An objective lens drive device of an optical pickup according to claim 10, wherein the coil seating comprises a heat resisting resin plate and has a plurality of protruding terminals for winding end portions of the focus coil and at least one tracking coil at top and bottom ends of the coil seating.

13. An objective lens drive device of an optical pickup according to claim 10, wherein:

the focus coil spool is arranged in the center of the coil seating; and the at least one tracking coil spool comprises four tracking coil spools positioned around the focus coil spool symmetrically in vertical and horizontal directions.

14. An objective lens drive device of an optical pickup according to claim 10, wherein:

the focus coil spool is arranged in the center of the coil seating; and the at least one tracking coil spool comprises two tracking coil spools positioned around the focus coil spool symmetrically in horizontal directions.

15. An objective lens drive device of an optical pickup according to claim 10, wherein:

the focus coil spool is arranged in the center of the coil seating and has a hollow section; and the at least one tracking coil spool comprises four tracking coil spools positioned in the hollow section of the focus coil spool symmetrically in vertical and horizontal directions.

16. An objective lens drive device of an optical pickup according to claim 10, wherein:

the focus coil spool is arranged in the center of the coil seating and has a hollow section; and the at least one tracking coil spool comprises two tracking coil spools positioned in the hollow section of the focus coil spool symmetrically in horizontal directions.

17. An objective lens drive device of an optical pickup comprising:

a flexurally elastic lens holder made of a resin containing a light metal or a carbon fiber; and a coil unit attached to two notches formed in the lens holder in the tracking direction.

18. An objective lens drive device of an optical pickup according to claim 17, wherein an insulation protective film is formed on the surface of the notches.

19. An objective lens drive device of an optical pickup according to claim 17, wherein an insulation protective film is formed on the section of the coil unit to be attached to the notches.

20. An objective lens drive device of an optical pickup comprising:

a flexuarally elastic lens holder made of a resin containing a light metal or a carbon fiber; and a coil unit is attached to the lens holder via insert mold.

21. An objective lens drive device of an optical pickup according to claim 20, wherein an insulation protective film is formed on the section of the coil unit to be attached to the lens holder via insert mold.

* * * * *